United States Patent
Gaufin et al.

(10) Patent No.: US 10,591,009 B2
(45) Date of Patent: Mar. 17, 2020

(54) VEHICLE SPRING BRAKES HAVING REDUCED LENGTH

(71) Applicant: TSE Brakes, Inc., Cullman, AL (US)

(72) Inventors: Carl Gaufin, Madison, AL (US); Ryan Fechner, Madison, AL (US)

(73) Assignee: TSE Brakes, Inc., Cullman, AL (US)

( * ) Notice: Subject to any disclaimer, the term of this patent is extended or adjusted under 35 U.S.C. 154(b) by 57 days.

(21) Appl. No.: 15/932,322

(22) Filed: Feb. 16, 2018

(65) Prior Publication Data

US 2018/0231082 A1    Aug. 16, 2018

Related U.S. Application Data

(60) Provisional application No. 62/459,715, filed on Feb. 16, 2017.

(51) Int. Cl.
| | |
|---|---|
| *B60T 17/08* | (2006.01) |
| *F16D 65/28* | (2006.01) |
| *B60T 15/04* | (2006.01) |
| *F16D 125/12* | (2012.01) |
| *F16D 121/14* | (2012.01) |
| *F16D 121/10* | (2012.01) |

(52) U.S. Cl.
CPC ............ *F16D 65/28* (2013.01); *B60T 15/041* (2013.01); *B60T 15/043* (2013.01); *B60T 17/083* (2013.01); *F16D 2121/10* (2013.01); *F16D 2121/14* (2013.01); *F16D 2125/12* (2013.01)

(58) Field of Classification Search
CPC .. F16D 65/28; F16D 2121/10; F16D 2121/14; F16D 2125/12; B60T 15/041; B60T 15/042; B60T 17/083; B60T 17/085
See application file for complete search history.

(56) References Cited

U.S. PATENT DOCUMENTS

| | | | | |
|---|---|---|---|---|
| 3,712,178 | A | * | 1/1973 | Hensley ................ B60T 13/261 91/170 R |
| 3,811,365 | A | * | 5/1974 | Gordon ................ B60T 17/083 92/63 |
| 3,813,994 | A | * | 6/1974 | Swander, Jr. ......... B60T 17/083 91/471 |

(Continued)

FOREIGN PATENT DOCUMENTS

| | | |
|---|---|---|
| WO | 2004078549 A1 | 9/2004 |
| WO | 2013075762 A1 | 5/2013 |

*Primary Examiner* — Thomas W Irvin
(74) *Attorney, Agent, or Firm* — Andrus Intellectual Property Law, LLP

(57) ABSTRACT

A vehicle spring brake having a parking brake housing that defines a parking brake chamber and a service brake housing that defines a service brake chamber. A flexible membrane separates the parking brake chamber from the service brake chamber and flexes into and out of the service brake chamber based upon a pressure differential between an air pressure in the parking brake chamber and an air pressure in the service brake chamber. A pushrod extends out of the service brake housing when the flexible membrane flexes into the service brake chamber and retracts into the service brake housing when the flexible membrane flexes back out of the service brake chamber. A control valve controls the pressure differential to thereby control movement of the flexible membrane and the pushrod.

22 Claims, 13 Drawing Sheets

(56) References Cited

U.S. PATENT DOCUMENTS

| | | | | |
|---|---|---|---|---|
| 3,926,094 A * | 12/1975 | Kurichh | B60T 17/083 | 92/63 |
| 4,263,840 A * | 4/1981 | Herrera | B60T 17/086 | 92/128 |
| 4,364,305 A * | 12/1982 | Dalibout | B60T 17/083 | 188/170 |
| 4,796,513 A * | 1/1989 | Hata | B60T 17/085 | 92/129 |
| 4,860,640 A * | 8/1989 | Ware | B60T 17/083 | 92/63 |
| 4,960,036 A * | 10/1990 | Gummer | B60T 17/083 | 92/63 |
| 5,067,391 A * | 11/1991 | Choinski | B60T 17/083 | 29/521 |
| 5,105,727 A * | 4/1992 | Bowyer | B60T 17/083 | 92/63 |
| 5,315,918 A * | 5/1994 | Pierce | B60T 17/083 | 403/270 |
| 5,507,217 A * | 4/1996 | Plantan | B60T 17/083 | 92/100 |
| 5,526,732 A * | 6/1996 | Stojic | B60T 17/083 | 403/225 |
| 5,588,348 A * | 12/1996 | Plantan | B60T 17/083 | 92/130 A |
| 5,623,862 A * | 4/1997 | Hanaway | B60T 17/083 | 92/48 |
| 5,706,714 A * | 1/1998 | Piette | B60T 17/083 | 92/130 A |
| 5,771,774 A * | 6/1998 | Stojic | B60T 17/083 | 29/888.06 |
| 5,799,564 A * | 9/1998 | Pierce | B60T 17/083 | 92/129 |
| 5,829,339 A | 11/1998 | Smith | | |
| 5,937,733 A * | 8/1999 | Stojic | B60T 17/083 | 92/110 |
| 6,006,651 A * | 12/1999 | Pierce | B01D 46/10 | 92/63 |
| 6,164,187 A * | 12/2000 | Stojic | B60T 17/083 | 92/63 |
| 6,238,132 B1 * | 5/2001 | Plantan | B60T 17/083 | 403/230 |
| 6,314,861 B1 * | 11/2001 | Smith | B60T 17/083 | 92/130 A |
| 6,694,866 B2 | 2/2004 | Smith et al. | | |
| 6,907,818 B2 * | 6/2005 | Anderson | B60T 13/261 | 92/62 |
| 7,451,690 B2 | 11/2008 | Schrader et al. | | |
| 7,493,993 B2 | 2/2009 | Petterson | | |
| 7,743,894 B2 * | 6/2010 | Scheckelhoff | B60T 17/083 | 188/153 D |
| 8,011,483 B2 * | 9/2011 | Brandt | B60T 17/083 | 188/153 D |
| 8,978,839 B2 * | 3/2015 | Bradford | B60T 17/083 | 188/106 F |
| 9,050,958 B2 | 6/2015 | Gaufin | | |
| 9,297,392 B2 | 3/2016 | Gaufin | | |
| 9,701,294 B2 * | 7/2017 | Schwartz | B60T 13/588 | |
| 2002/0148351 A1 * | 10/2002 | Anderson | B60T 17/085 | 92/98 R |
| 2007/0017757 A1 * | 1/2007 | Schrader | B60T 17/085 | 188/170 |
| 2010/0320039 A1 | 12/2010 | Iraschko | | |
| 2011/0297492 A1 | 12/2011 | Iraschko | | |

\* cited by examiner

VEHICLE SPRING BRAKES HAVING REDUCED LENGTH

CROSS-REFERENCE TO RELATED APPLICATION

The present application is based on and claims priority to U.S. Provisional Patent Application Ser. No. 62/459,715 filed Feb. 16, 2017, the disclosure of which is incorporated herein by reference.

FIELD

The present disclosure relates to vehicle spring brakes having reduced length.

BACKGROUND

The following U.S. Patents are incorporated herein by reference in entirety.

U.S. Pat. No. 5,829,339 discloses a sealed bushing assembly adapted to permit a push rod to pass through an adapter isolating a pressurized chamber, formed by attaching a sleeve to the adapter, inserting a bushing, and crimping the end of the sleeve opposite said adapter to restrain the bushing.

U.S. Pat. No. 6,314,861 discloses a diaphragm-based spring brake actuator assembly which allows for the delivery of more force to the push rod without increasing the size of the actuator unit. A stronger heavy main compression spring located in the emergency brake chamber provides greater emergency or parking brake force to the push rod, and a service brake chamber operates more efficiently when braking pressure is introduced. A large pressure plate is positioned inside either the emergency housing or the service brake housing, or both, to deliver more force to the push rod of the actuator.

U.S. Pat. No. 9,050,958 discloses a rotationally adjustable brake actuator includes a pressure housing with a circumferential rim, a non-pressure housing having a second circumferential rim, and a diaphragm disposed there between. A retaining ring holds the respective housings against each other such that the first rim abuts the second rim, but where the respective housings are able to be rotated with respect to the other. Further, the retaining ring includes a radially-oriented hole and a stop pin that is inserted into the hole and engages the pressure housing to prevent further rotation.

U.S. Pat. No. 9,297,392 discloses a pneumatic actuator includes a housing defining a chamber. A diaphragm is positioned within the chamber. A rod member is attached to the diaphragm and is movable between a first position and a second position. A cam member is attached to the diaphragm and to the rod member. The cam member has a cam surface. A deflection rod has a first end portion and a second end portion, where the first end portion of the deflection rod is attached to the housing. A follower is attached to the second end portion of the deflection rod. The follower engages the cam surface of the cam member so as to urge the rod member towards the second position.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a vehicle spring brake having a parking brake housing that defines a parking brake chamber and a service brake housing that defines a service brake chamber. A flexible membrane separates the parking brake chamber from the service brake chamber and flexes into and out of the service brake chamber based upon a pressure differential between an air pressure in the parking brake chamber and an air pressure in the service brake chamber. A pushrod extends out of the service brake housing when the flexible diaphragm flexes into the service brake chamber and retracts into the service brake housing when the flexible membrane flexes back out of the service brake chamber. A control valve controls the pressure differential to thereby control movement of the flexible membrane and the pushrod.

In certain examples, a vehicle spring brake has a parking brake housing that defines a parking brake chamber and a service brake housing that defines a service brake chamber. A flexible membrane separates the parking brake chamber and the service brake chamber and flexes as a pressure differential between air pressure in the parking brake chamber and air pressure in the service brake chamber changes. A pushrod extends out of the service brake chamber as the flexible membrane flexes in a first direction and retracts into the service brake chamber as the flexible membrane flexes in an opposite, second direction.

In certain examples, a method for operating a vehicle spring brake includes defining a parking brake chamber with a parking brake housing and a service brake chamber with a service brake housing; positioning a flexible membrane between the parking brake housing and the service brake housing such that the flexible membrane separates the parking brake chamber from the service brake chamber. The flexible membrane flexes into and out of the service brake chamber based upon a pressure differential between an air pressure in the parking brake chamber and an air pressure in the service brake chamber. The method can further include positioning a pushrod in the service brake chamber such that the push rod extends out of the service brake housing when the flexible membrane flexes into the service brake chamber and retracts into the service brake housing when the flexible membrane flexes back out of the service brake chamber such that the pushrod applies a braking force on a vehicle when the pushrod extends out of the service brake housing and controlling, with a control valve that is coupled to a vehicle air system, the pressure differential to thereby control movement of the flexible membrane and the pushrod.

Various other features, objects, and advantages will be made apparent from the following description taken together with the drawings.

BRIEF DESCRIPTION OF THE DRAWINGS

Examples of the present disclosure are described with reference to the following drawing figures. The same numbers are used throughout the drawing figures to reference like features and components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

Figure 1:
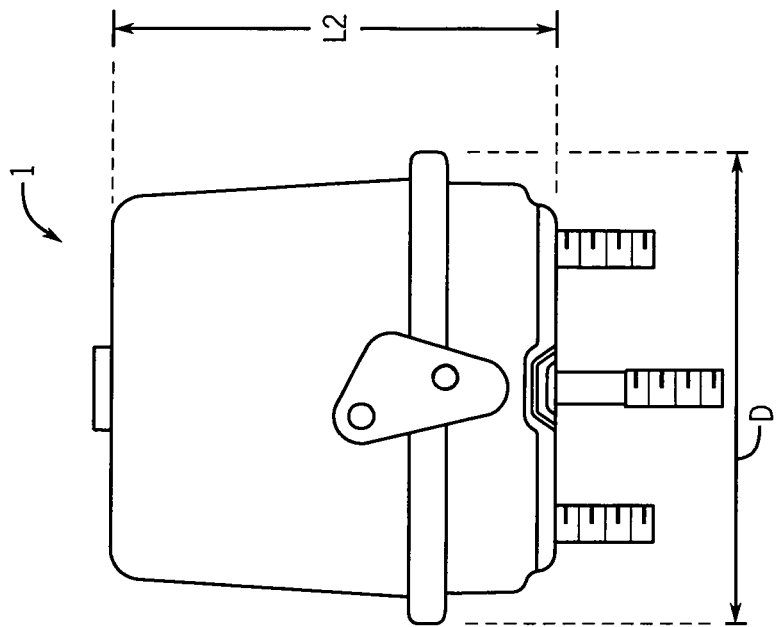
FIG. 1 depicts a prior art spring brake.
Figure 2:
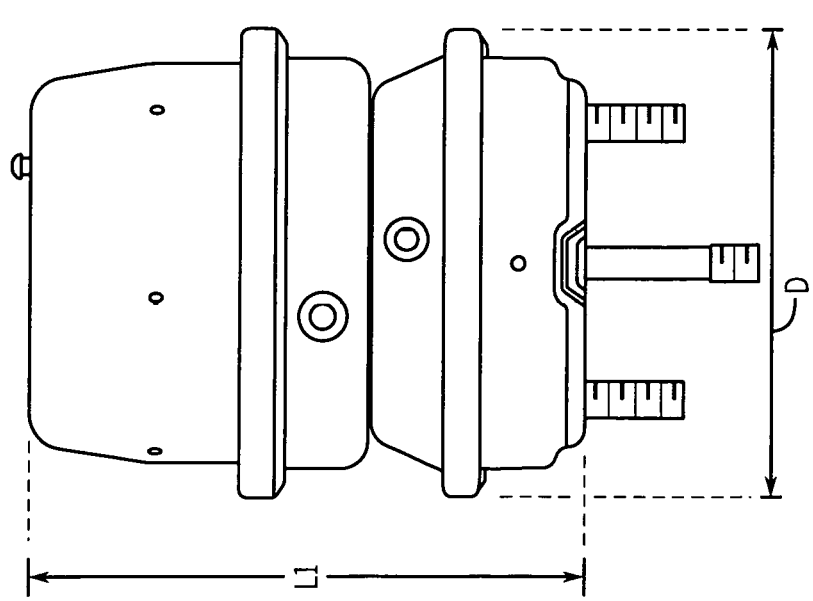
FIG. 2 depicts an example spring brake according to the present disclosure.

FIG. 1 depicts a conventional spring brake having an overall length dimension L1 (see above incorporated U.S. Patents for additional examples of spring brakes). FIG. 2 depicts an example spring brake 1 of the present disclosure have an overall length dimension L2 that is less than the length dimension L1 of the spring brake depicted in FIG. 1. In certain examples, the outside diameters of the spring brake 1 of FIG. 1 and the spring brake of FIG. 2 are equivalent.

Figure 3:
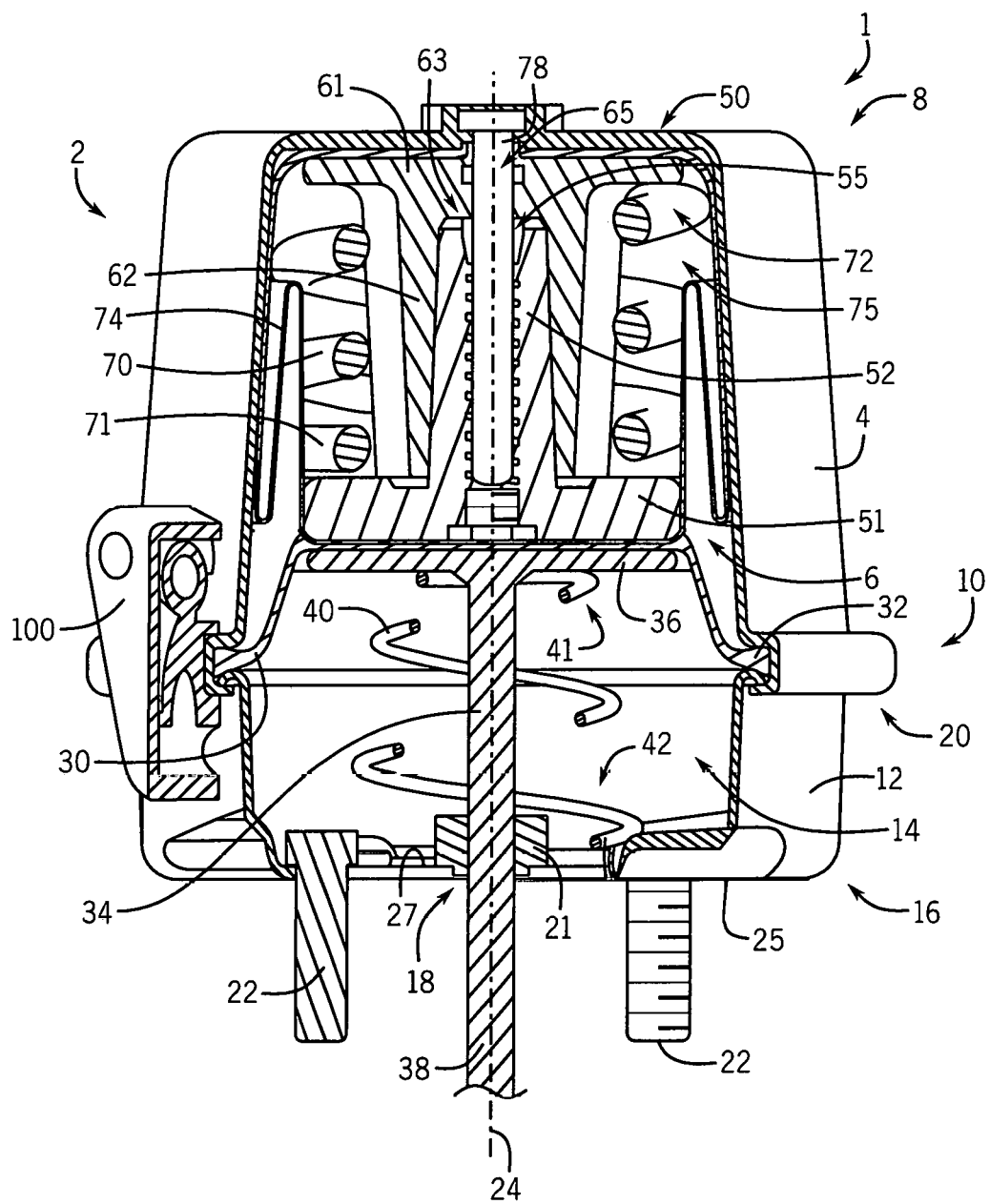
FIG. 3 depicts the spring brake of FIG. 2 in a driving mode and with a portion of a housing removed to expose the interior of the spring brake.
Figure 4:
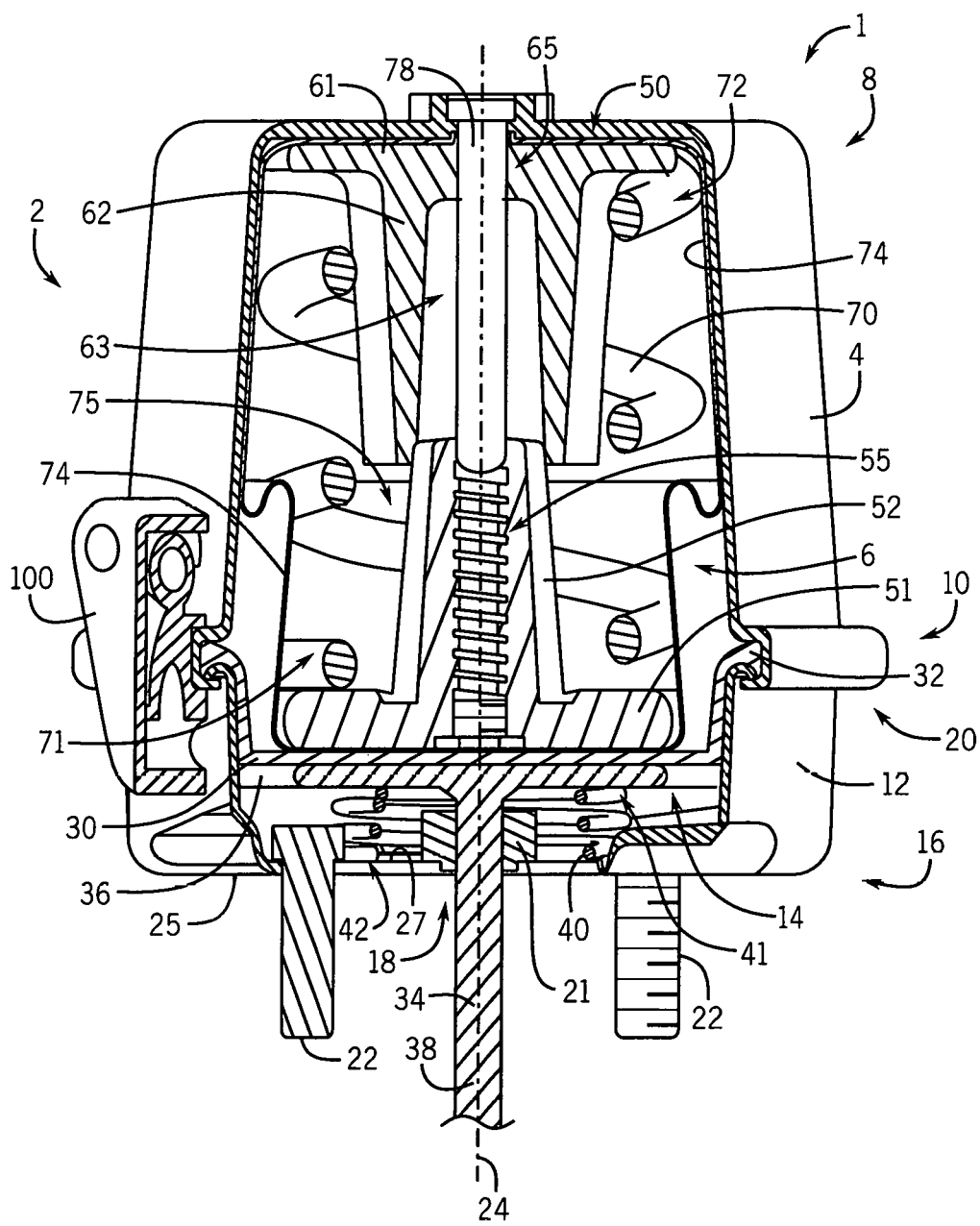
FIG. 4 is a view like FIG. 3 with the spring brake in a parking brake mode.
Figure 5:
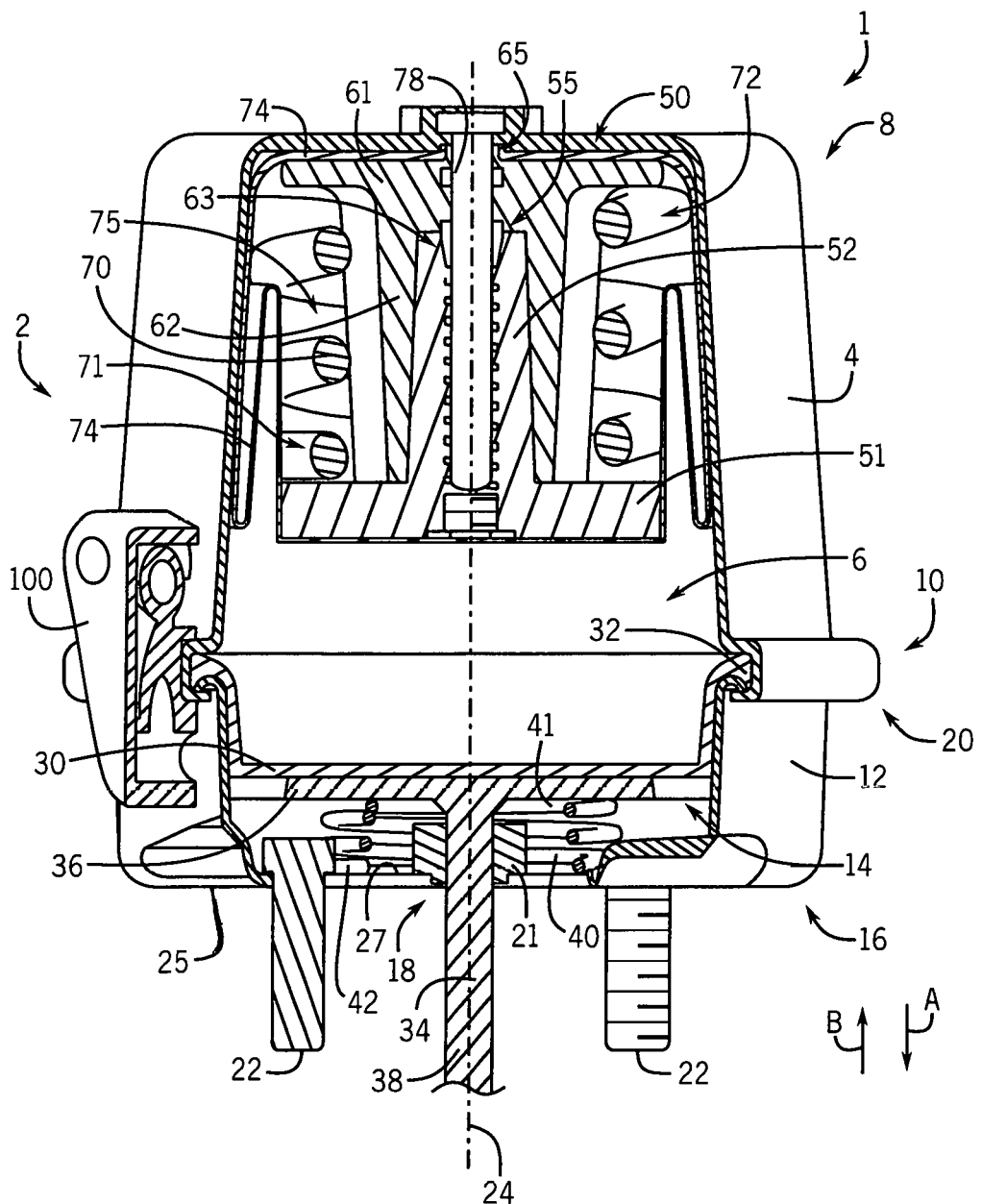
FIG. 5 is a view like FIG. 3 with the spring brake in a service braking mode.

FIGS. 3-5 depict the spring brake 1 of FIG. 2 in greater detail. The spring brake 1 includes a housing 2 (note a portion of the housing 2 is removed to expose the interior of the spring brake 1) having a first, parking brake housing 4 and a second, opposing service brake housing 12. The parking brake housing 4 defines a parking brake chamber 6 and has a closed end 8 and an opposite, mating end 10. Similarly, the service brake housing 12 defines a service brake chamber 14 and has a closed end 16 and an opposite, mating end 20.

The closed end 16 of the service brake chamber 14 defines a hole 18 through which a pushrod 34 extends, and the pushrod 34 is configured to slide back and forth in the hole 18, as further described herein below. An articulation seal 21 maintains an air tight seal between the pushrod 34 and the closed end 16 of the service brake housing 12 at all times, including during axial movement of the push rod 34 along the center axis 24 of the spring brake 1 and/or radial movement of the pushrod 34 which may be caused by other braking system apparatuses or components (not shown) acting on the pushrod 34. In certain examples, the service brake chamber 14 includes at least one mounting stud 22 that extends from an outer surface 25 of the closed end 16 of the service brake housing 12 and is configured to couple the spring brake 1 to a vehicle (not shown).

The mating end 10 of the parking brake housing 4 and the mating end 20 of the service brake housing 12 are coupled together such that the parking brake chamber 6 and the service brake chamber 14 are closed to the surrounding atmosphere. The parking brake housing 4 and the service brake housing 12 each have at least one opening 13 (FIG. 6) that allows air to enter and/or exit the chambers 6, 14. As depicted in FIG. 3, the parking brake housing 4 and the service brake housing 12 longitudinally (axially) extend along a center axis 24.

A flexible membrane 30 is disposed between the parking brake chamber 6 and the service brake chamber 14 and separates the parking brake chamber 6 from the service brake chamber 14. In certain examples, the flexible membrane 30 is a flexible diaphragm. In use, the flexible membrane 30 can flex into and out of the service brake chamber 14 based upon a pressure differential between the air pressure in the parking brake chamber 6 and the air pressure in the service brake chamber 14. In the depicted example, the flexible membrane 30 includes an outer perimetral edge 32 that is sealed and sandwiched between the mating end 10 of the parking brake housing 4 and the mating end 20 of the service brake housing 12 so that the air in the parking brake chamber 6 remains separated from the air in the service brake chamber 14. The manner in which the flexible membrane 30 is connected to the spring brake 1 can vary from that which is shown.

A control valve 100 (further described herein below) is fluidly coupled to the openings 13 (FIG. 6), and the control valve 100 is configured to regulate the air pressures in the chambers 6, 14 thereby controlling a pressure differential between the air pressures in the chambers 6, 14 and controlling movement of the flexible membrane 30 and the pushrod 34.

A pushrod 34 is positioned in the service brake housing 12 and is configured to extend out of the service brake housing 12 when the flexible membrane 30 flexes into the service brake chamber 14 (see FIGS. 4-5) and retract into the service brake housing 12 when the flexible membrane 30 flexes back out of the service brake chamber 14 (see FIG. 3). That is, the flexible membrane 30 and pushrod 34 move together in a first direction (see arrow A on FIG. 5) when the pressure in the service brake chamber 14 becomes less than the pressure in the parking brake chamber 6 and flexible membrane 30 and pushrod 34 move in an opposite, second direction (see arrow B on FIG. 5) when the pressure in the service brake chamber 14 equalizes and/or becomes greater than the pressure in the parking brake chamber 6. The pushrod 34 is configured for attachment to a conventional vehicle braking system of a vehicle (not shown) such that extension of the pushrod 34 out of the service brake housing 12 causes the vehicle braking system to apply a braking force on the vehicle (e.g. brake drums) and retraction of the pushrod 34 into the service brake housing 12 causes the vehicle braking system to decrease the braking force applied on the vehicle. The vehicle braking system can include various braking apparatuses or components (not shown; e.g. slack adjuster, brake adjustor, brake pads, brake drum).

Reference is made to the above-incorporated U.S. Patents for further description of vehicle braking systems and components thereof.

The pushrod 34 includes an end plate 36 positioned adjacent to the flexible membrane 30 and an elongated shaft 38 that slides back and forth along the axis 24 in the hole 18 defined by the service brake housing 12. As the flexible membrane 30 moves, the shaft 38 articulates and/or slides in the hole 18. In certain examples, the end plate 36 of the pushrod 34 is fixed to the flexible membrane 30 so that the flexible membrane 30 and pushrod 34 move together.

A return spring 40 is disposed in service brake chamber 14 on the pushrod 34 and is positioned between the end plate 36 and the closed end 16. The return spring 40 has a natural resiliency that tends to retract the pushrod 34 into the service brake chamber 14. In certain examples, the return spring 40 biases the end plate 36 of the pushrod 34 against the flexible membrane 30, away from the closed end 16 of the service brake housing 12. In the illustrated example, the service return spring 40 has a first end 41 that contacts the end plate 36 of the pushrod 34 and a second end 42 opposite the first end 41 that contacts the closed end 16 of the service brake housing 12 (e.g. the inner end surface 27 of the service brake housing 12). In operation, movement of the flexible membrane 30 into the service brake chamber 14 compresses the return spring 40 and slides the pushrod 34 along the axis 24, in a direction out of the service brake housing 12. In certain examples, the return spring 40 is coupled to the pushrod 34 and/or the end plate 36.

A parking spring assembly 50 is disposed in the parking brake chamber 6 and moves into and between an extended state (FIG. 4) in which the parking spring assembly 50 pushes the flexible membrane 30 into the service brake chamber 14 and thus the pushrod 34 out of the service brake housing 12 and a retracted state (FIG. 3) in which the parking spring assembly 50 does not push the flexible membrane 30 into the service brake chamber 14 or the pushrod 34 out of the service brake housing 12. The parking spring assembly 50 is normally retained in the retracted state (FIG. 3) by the air pressure in the parking brake chamber 6. In certain examples, increasing the air pressure in the parking brake chamber 6 compresses the parking spring assembly 50 into the retracted state (FIG. 3) and decreasing the air pressure in the parking brake chamber 6 allows the parking spring assembly 50 to move itself into the extended state (FIG. 4). In some examples, when the parking spring assembly 50 is in the retracted state (FIG. 3) the parking spring assembly 50 merely contacts the flexible membrane 30. That is, when the parking spring assembly 50 is in the retracted state (FIG. 3) the parking spring assembly 50 does not exert a force on the flexible membrane 30 or is spaced apart from the flexible membrane 30.

An air-tight flexible envelope 74 envelops the parking spring assembly 50. The air-tight flexible envelope 74 defines a cavity 75 within and separate from the parking brake chamber 6 that is fluidly separate from the parking brake chamber 6 (i.e. the flexible envelope 74 is air-tight and thus fluidly isolates the cavity 75 from the parking brake chamber 6). In use, increasing the air pressure in the parking brake chamber 6 compresses the air-tight flexible envelope 74 to thereby move the parking spring assembly 50 into the retracted state (FIG. 3). Optionally, the cavity 75 can be a vacuum cavity.

The air-tight flexible envelope 74 is configured to axially expand or lengthen (FIG. 4) and contract or shorten (FIG. 3) as the parking spring assembly 50 expands and is compressed, respectively. The air-tight flexible envelope 74 can include material folds that accommodate expansion and compression of the parking spring assembly 50. The air-tight flexible envelope 74 can be made of any suitable elastic or flexible material such as plastic, rubber, and/or the like. In certain examples, the air-tight flexible envelope 74 is made from the same material commonly used in vehicle air suspension bags. Examples of commercially available material suitable for the air-tight flexible envelope are manufactured by Firestone and DuPont.

A parking spring 70 is configured to extend or expand and retract or compress as the parking spring assembly 50 moves into and between the retracted state (FIG. 3) and the extended state (FIG. 4). In use, decreasing the air pressure in the parking brake chamber 6 permits the parking spring 70 to naturally extend the parking spring assembly 50 into the extended state (FIG. 4). Conversely, increasing the air pressure in the parking brake chamber 6 compresses the flexible envelope 74 such that the parking spring 70 compresses and the parking spring assembly 50 moves the into the retracted state (FIG. 3). The parking brake chamber 6 is configured to be pressurized such that pressurization of the parking brake chamber 6 above a natural resiliency of the parking spring 70 compresses the parking spring assembly 50. More specifically, the air-tight flexible envelope 74 compresses the parking spring 70 when the air pressure in the parking brake chamber 6 becomes equal to or greater than the natural resiliency of the parking spring 70.

The parking spring assembly 50 includes end plates 51, 61 that are disposed on opposing sides 71, 72 of the parking spring 70. The parking spring 70 tends to bias the end plates 51, 61 apart from each other such that increasing the air pressure in the parking brake chamber 6 compresses the air-tight flexible envelope 74 and thereby forces the end plates 51, 61 toward each other and against the natural resiliency of the parking spring 70. The end plates 51, 61 include telescoping sleeves 52, 62 that are nested together and can telescopically move with respect to each other as the air pressure in the parking brake chamber 6 increases and/or decreases thereby aiding in alignment of the parking spring 70. The diameter of the sleeves 52, 62 tapers inwardly, as the sleeves 52, 62 extend away from the end plates 51, 61. In certain examples, the end plate 61 is coupled to and/or integral with the closed end 8 of the parking brake housing 4. In certain examples, the air-tight flexible envelope 74 can include grooves or fins (not shown) that separate the closed end 8 of the parking brake housing 4 from the parking spring assembly 50 and allow air to flow between the end plate 61 and the closed end 8 of the parking brake housing 4.

A guide rod 78 is coupled to the closed end 8 of the parking brake housing 4 and is configured to guide the end plates 51, 61 along the axis 24. That is, the guide rod 78 guides the end plates 51, 61 along the axis 24 as the end plates 51, 61, the parking spring 70, and/or the air-tight flexible envelope 74 move (FIG. 4). The guide rod 78 projects from the inner surface of the parking brake chamber 6 and extends along the axis 24. The end plates 51, 61 further define bores 55, 65 that slidably receive the guide rod 78.

FIGS. 3-5 illustrate the spring brake 1 in different operational modes, as described herein below.

FIG. 4 depicts the spring brake 1 in a parking brake mode in which the parking brake chamber 6 and the service brake chamber 14 are unpressurized or have relatively low air pressures such that the natural resiliency of the parking spring 70 in the parking spring assembly 50 causes the flexible membrane 30 to flex into the service brake chamber 14 and the pushrod 34 to extend from the service brake housing 12. This causes the vehicle braking system to slow or stop the vehicle (as described above; reference is made to the above incorporated U.S. Patents for further description of vehicle braking systems). The spring brake 1 remains in the parking brake mode until the air pressure in parking brake chamber 6 is increased by a vehicle air system (not shown) such that parking brake assembly 50 moves to a retracted state and the spring brake 1 enters a driving mode (FIG. 3). Parking brake mode is typically selected and enacted by the operator in the cab of the vehicle.

FIG. 3 depicts the spring brake 1 in the driving mode in which the vehicle air system and associated control valve 100 cause an increase in the air pressure to the chambers 6, 14 such that the air pressure in the parking brake chamber 6 acts on the air-tight flexible envelope 74 to thereby compress the parking spring assembly 50 into and hold the parking spring assembly 50 in the retracted state. Specifically, as air pressure acts on the air-tight flexible envelope 74 the parking spring assembly 50 compresses and retracts, the sleeves 52, 62 telescopically retract, and the end plates 51, 61 slide toward each other along the guide rod 78. In the retracted/compressed state, the parking spring assembly 50 does not act on the flexible membrane 30 or the pushrod 34. The vehicle air system may increase or decrease (i.e. release) the air pressure in the chambers 6, 14 based on different vehicle operations (e.g. when the vehicle is turned on, the brake pedal is depressed, an emergency brake release switch is actuated) (reference is made to the above-referenced U.S. Patents for further description of example vehicle operations). The spring brake 1 remains in the driving mode until an operator engages, for example, a brake pedal (not shown) which causes the spring brake 1 to be placed in a service braking mode (FIG. 5) described herein below.

FIG. 5 depicts the spring brake 1 in the service braking mode. The operator engages the brake pedal (e.g., depresses the brake pedal) such that control valve 100 decreases the air pressure in the service brake chamber 14. The decrease of the air pressure in the service brake chamber 14 changes the pressure differential between the air pressures in the chambers 6, 14 such that the flexible membrane 30 is flexed into the service brake chamber 14 and the pushrod 34 extends out of the service brake housing 12 to thereby slow or stop the vehicle as the pushrod 34 interacts with other apparatuses or components of the vehicle braking system (not shown; reference is made to the above incorporated U.S. Patens for example components and operations of the vehicle braking system). In one example, the control valve 100 decreases the air pressure in the service brake chamber 14 by exhausting an amount of air from the service brake chamber 14 to thereby decrease the air pressure in the service brake chamber 14 relative to the air pressure in the parking brake chamber 6.

The spring brake 1 returns to the driving mode (FIG. 3) from the service braking mode (FIG. 5) when the operator releases (e.g. stops depressing) the brake pedal. When the brake pedal is released, the vehicle air system, by way of the control valve 100, increases the air pressure in the service brake chamber 14 such that the flexible membrane 30 flexes toward and/or into the parking brake chamber 6 and the pushrod 34 retracts and/or slides into the service brake chamber 14. The spring brake 1 returns to parking brake mode (FIG. 4) when the operator turns the vehicle off and/or engages the emergency brake release switch which causes air pressures in both chambers to decrease.

Figure 6:
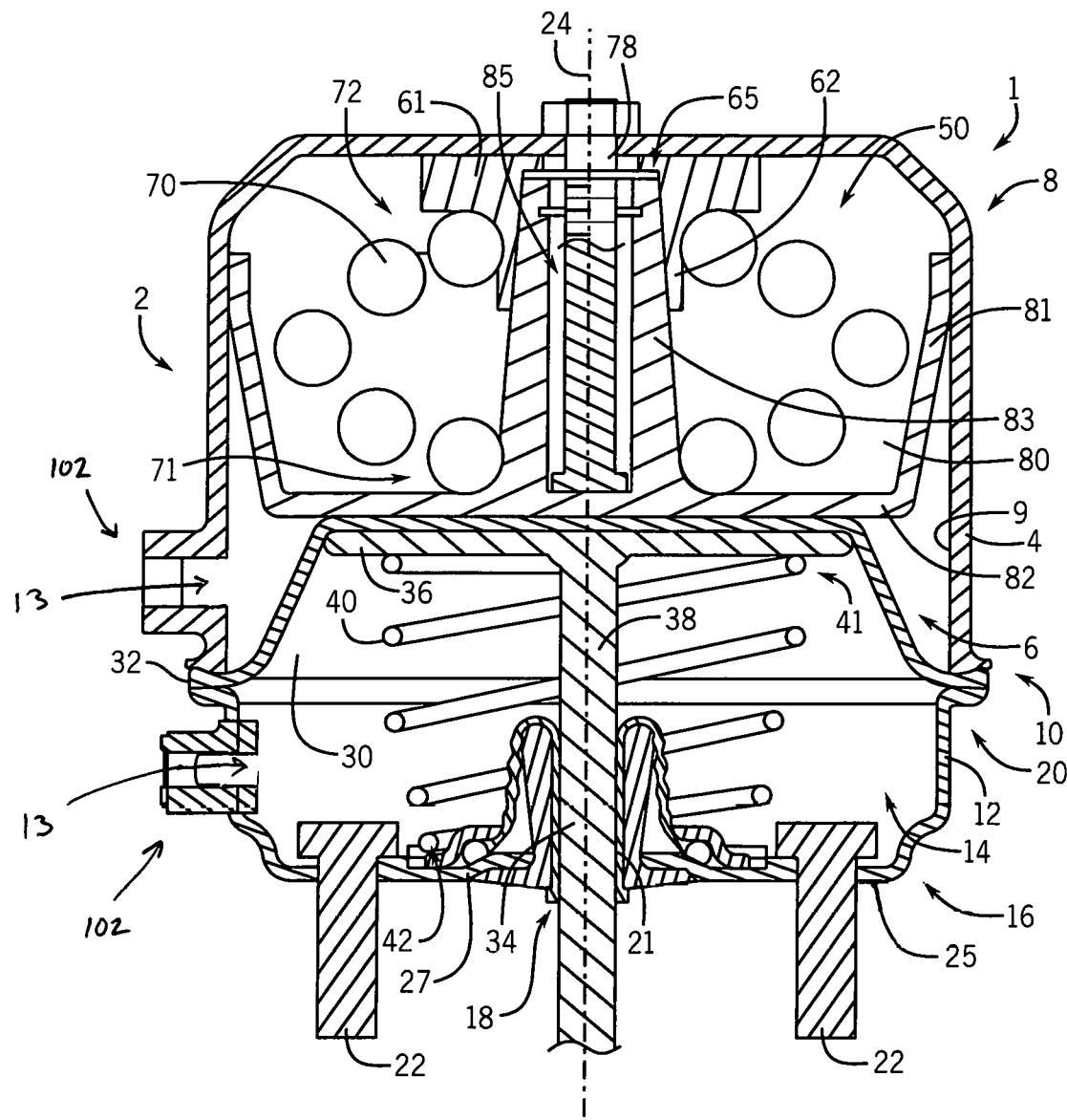
FIG. 6 depicts another example spring brake according to the present disclosure in a driving mode and with a portion of a housing removed to expose the interior of the spring brake.
Figure 7:
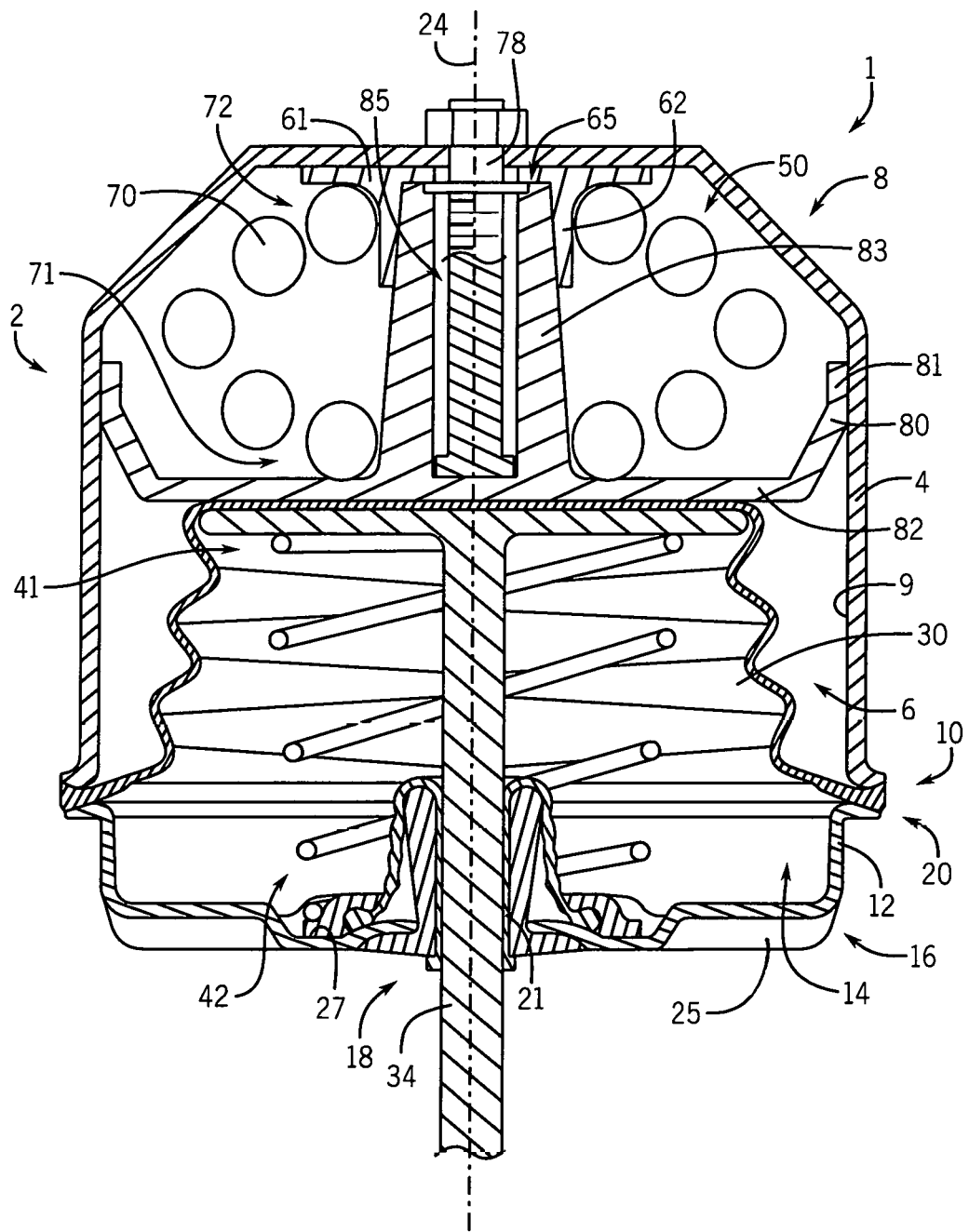
FIG. 7 depicts another example spring brake according to the present disclosure in a driving mode and with a portion of a housing removed to expose the interior of the spring brake. A flexible membrane in the spring brake is a bellows.

FIGS. 6-7 depict other examples of the spring brakes 1 in a driving mode. The spring brakes 1 includes a piston 80 that has an outer piston surface 81 that contacts and/or seals with an inner side surface 9 of the parking brake housing 4. The piston 80 includes a plate 82 and a sleeve 83 that nests with the sleeve 62. The parking spring 70 tends to bias the plate 82 of the piston 80 apart from the end plate 61 such that increasing the air pressure in the parking brake chamber 6 causes the outer piston surface 81 to slide along the inner side surface 9 of the parking brake housing 4 toward the closed end 8 of the parking brake housing 4 and thereby forces the end plate 61 and the plate 82 closer together against the natural resiliency of the parking spring 70. The sleeve 62 and the sleeve 83 of the piston 80 nest together and telescope with respect to each other as the air pressure in the parking brake chamber 6 increases and/or decreases thereby aiding in alignment of the parking spring 70. The outer diameter of the sleeve 83 tapers inwardly, as the sleeve 83 extends away from the plate 82. The sleeve 83 further defines bore 85 that slidably receives the guide rod 78. The guide rod 78 is configured to guide the piston 80 along the axis 24. FIG. 7 depicts the flexible membrane 30 as a bellows membrane.

Figure 8:
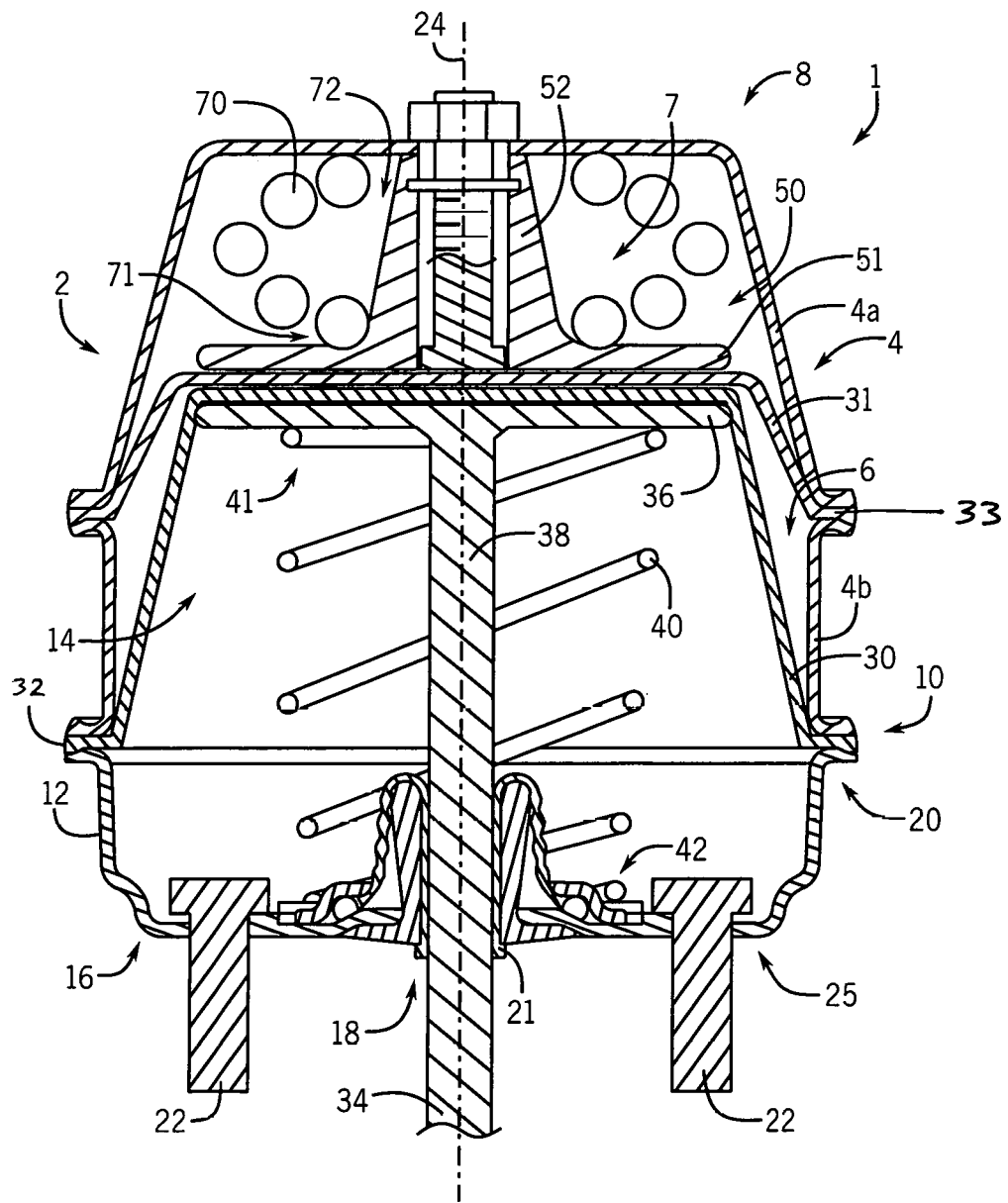
FIG. 8 depicts another example spring brake according to the present disclosure in a driving mode and with a portion of a housing removed to expose the interior of the spring brake.

FIG. 8 depicts another example of the spring brake 1 with a flexible membrane 30 and a secondary flexible membrane 31. The secondary flexible membrane 31 can flex as the pressure in the parking brake chamber 6 and/or the service brake chamber 14 change, and the secondary flexible membrane 31 is disposed between the parking brake chamber 6 and an end chamber 7 that can be open to the atmosphere. The secondary flexible membrane 31 includes an outer perimetral edge 33 that is sealed and/or sandwiched between two sections 4a, 4b of the parking brake housing 4 so that the air in the parking brake chamber 6 remains separated from the end chamber 7.

Figure 9:
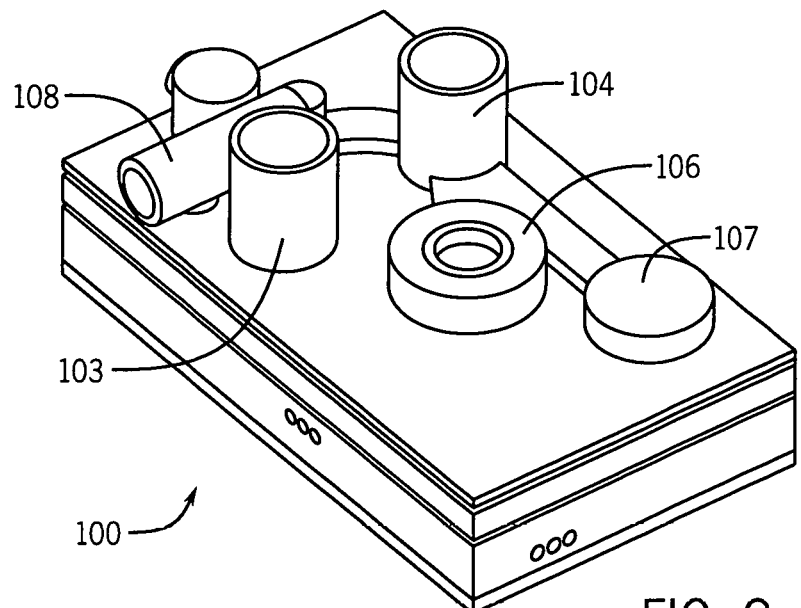
FIG. 9 is a top perspective view of an example control valve according to the present disclosure.
Figure 10:
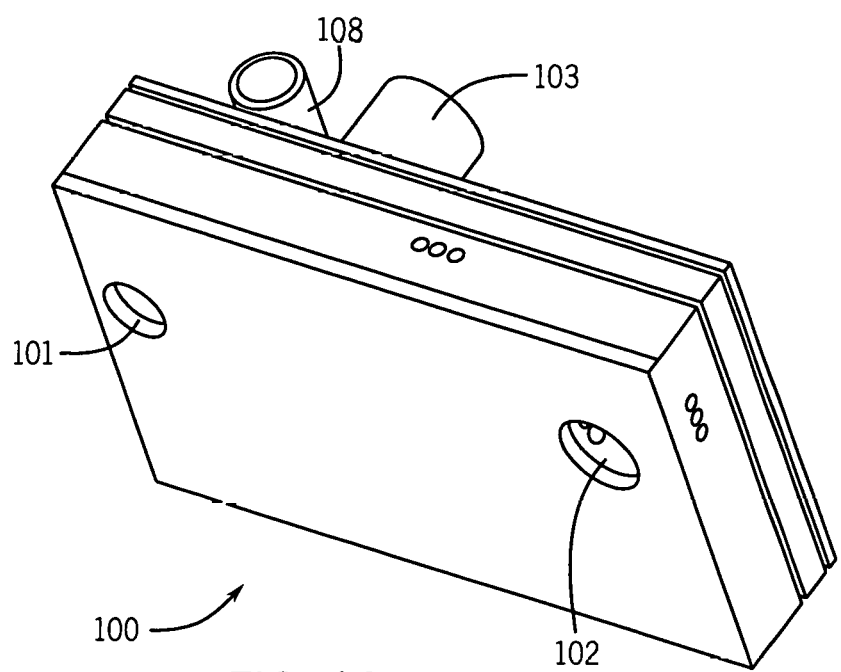
FIG. 10 is a bottom perspective view of the control valve of FIG. 9.
Figure 11:
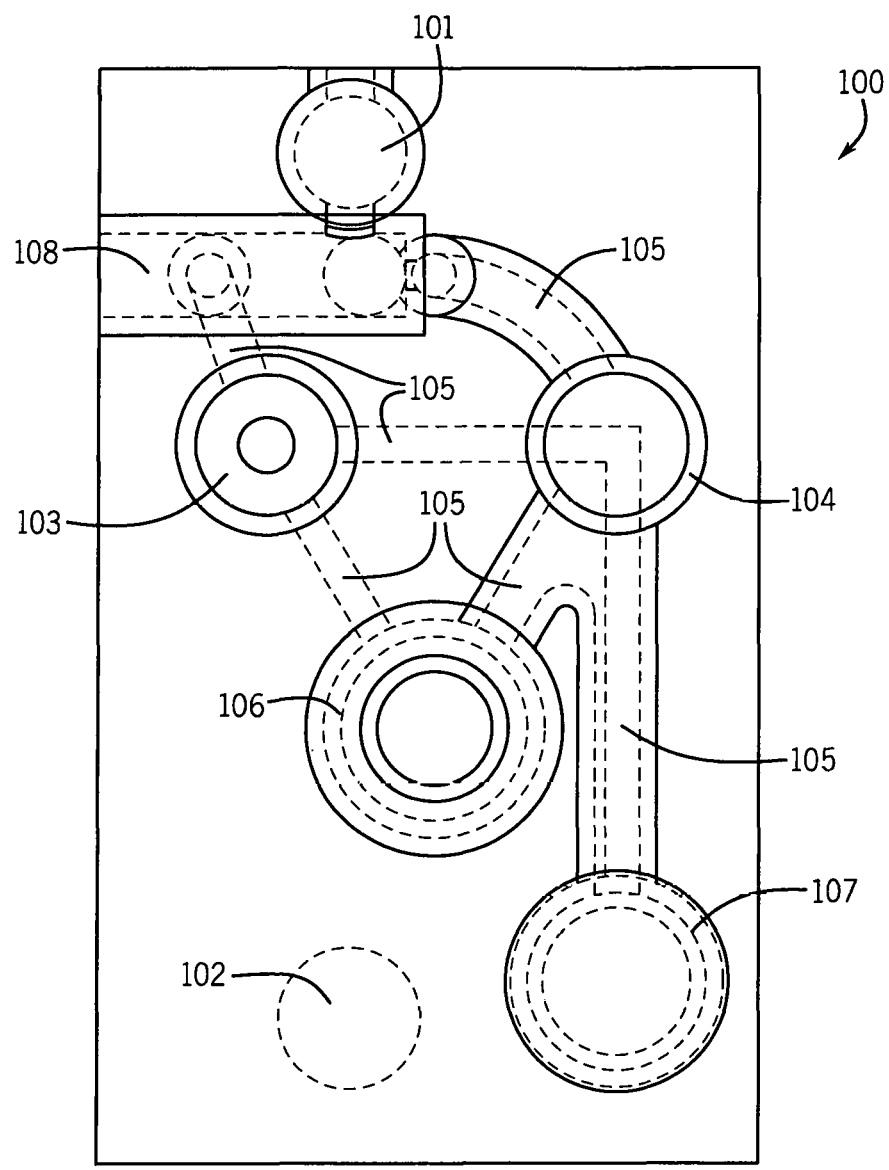
FIG. 11 is a top view of the control valve of FIG. 9.

Referring to FIGS. 9-11, the control valve 100 controls and regulates the air pressures in the chambers 6, 14 to vary the pressure differential between the air pressures in the chambers 6, 14 as the spring brake 1 (FIGS. 3-5) operates. The type and configuration of the control valve 100 can vary from that which is shown. In the illustrated example, the control valve 100 has a parking port 103 and a service port 104 that both receive air from the vehicle air system (not shown). A first valve port 101 is coupled to the parking brake housing 4 (FIGS. 3-5) such that the first valve port 101 is in fluid communication with the opening 13 (FIG. 6) defined in the parking brake housing 4, and the a second valve port 102 is coupled to the service brake housing 12 such that the second valve port 102 is in fluid communication with the opening 13 (FIG. 6) defined in the service brake housing 12. The parking port 103, the service port 104, and the valve ports 101, 102 are fluidly coupled together by a plurality of channels 105 in the control valve 100. A plurality of valves in the control valve 100 open and close to regulate air pressures in the chambers 6, 14. In the illustrated example, the control valve 100 includes a first exhaust valve 106, a second exhaust valve 107, a shuttle valve 108, and an exhaust port 110. However other types and configurations of valves may be employed. In operation, the control valve 100 relays air to the exhaust valves 106, 107 to thereby decrease the air pressure in the service brake chamber 14 and thereby change the pressure differential between the air pressures in the chambers 6, 14.

Figure 12:
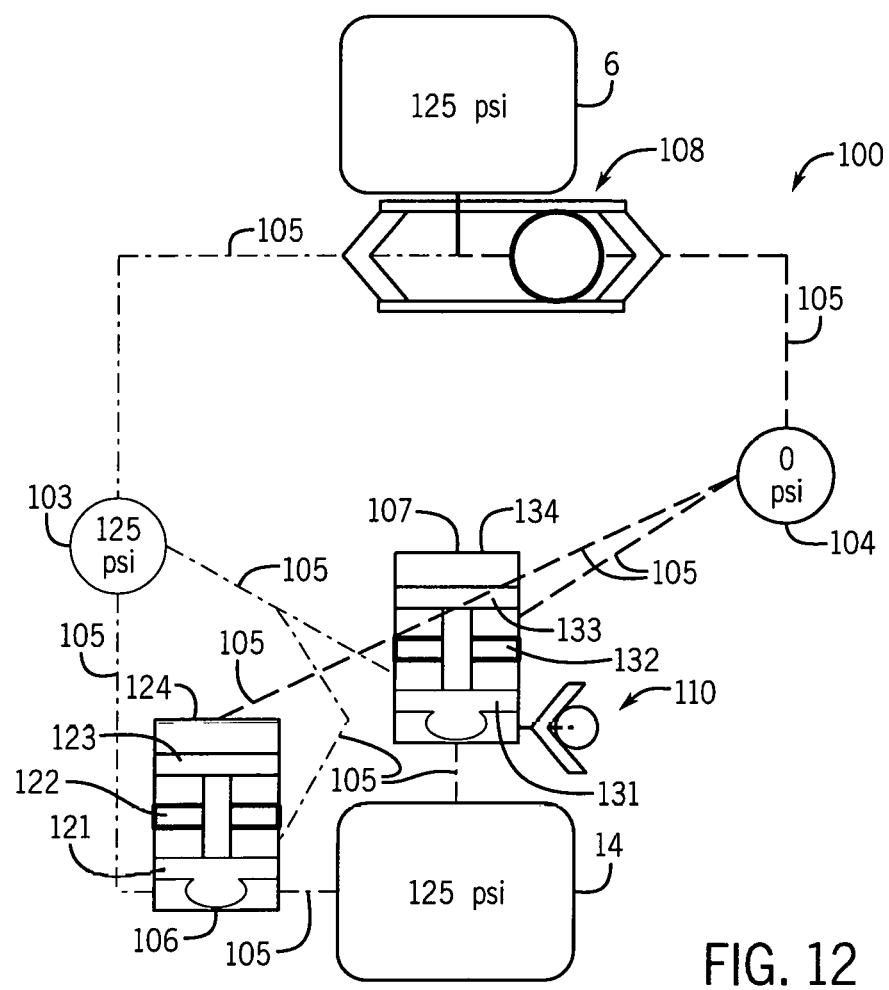
FIG. 12 is a schematic of the spring brake and the control valve in the driving mode.
Figure 14:
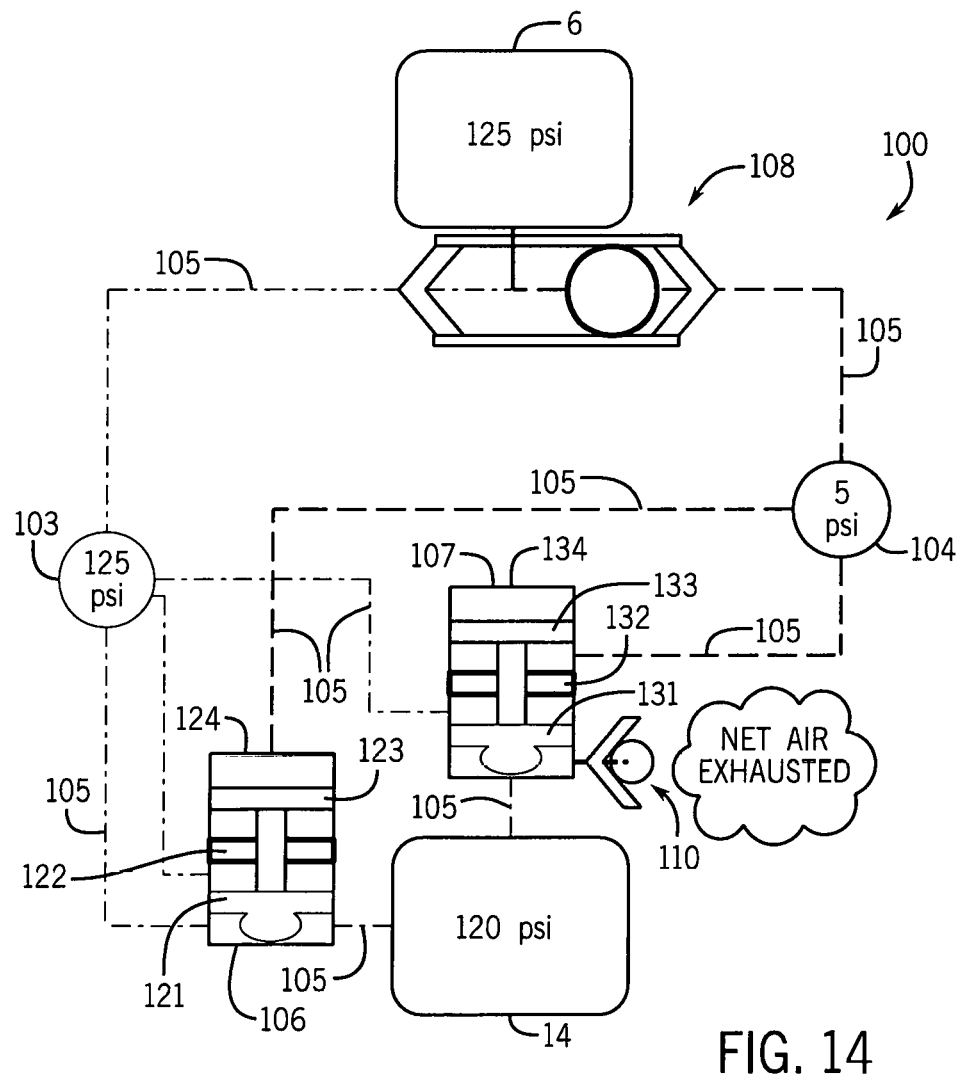
FIG. 14 is a schematic of the spring brake and the control valve in the service braking mode.
Figure 15:
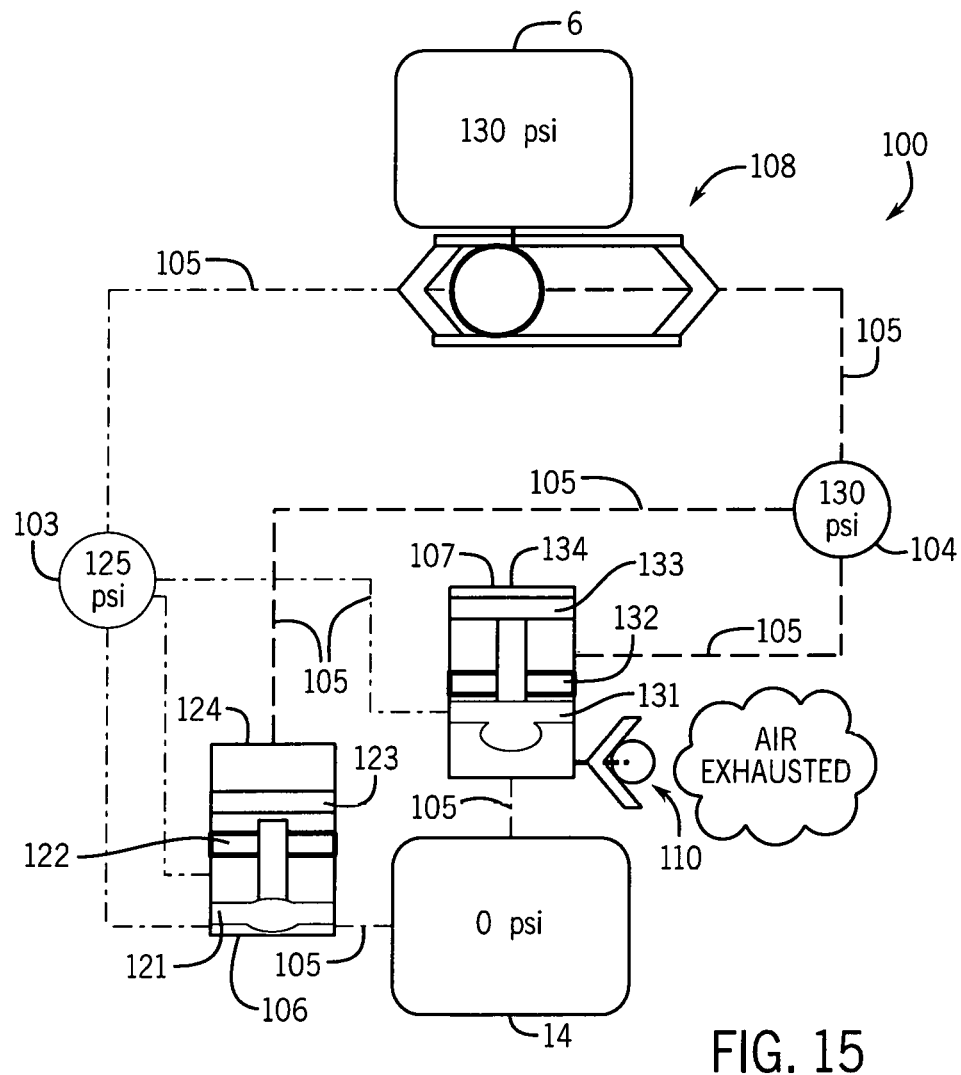
FIG. 15 is a schematic of the spring brake and the control valve in an extreme service braking mode.

FIGS. 12 and 14-15 are schematic examples of the control valve 100 in various operational modes. Note that non-limiting numerical values for air pressures (expressed in pounds per square inch (PSI) of pressure) are used for illustrative purposes, and a person of ordinary skill in the art will art will recognize that the air pressure can vary.

Figure 13:
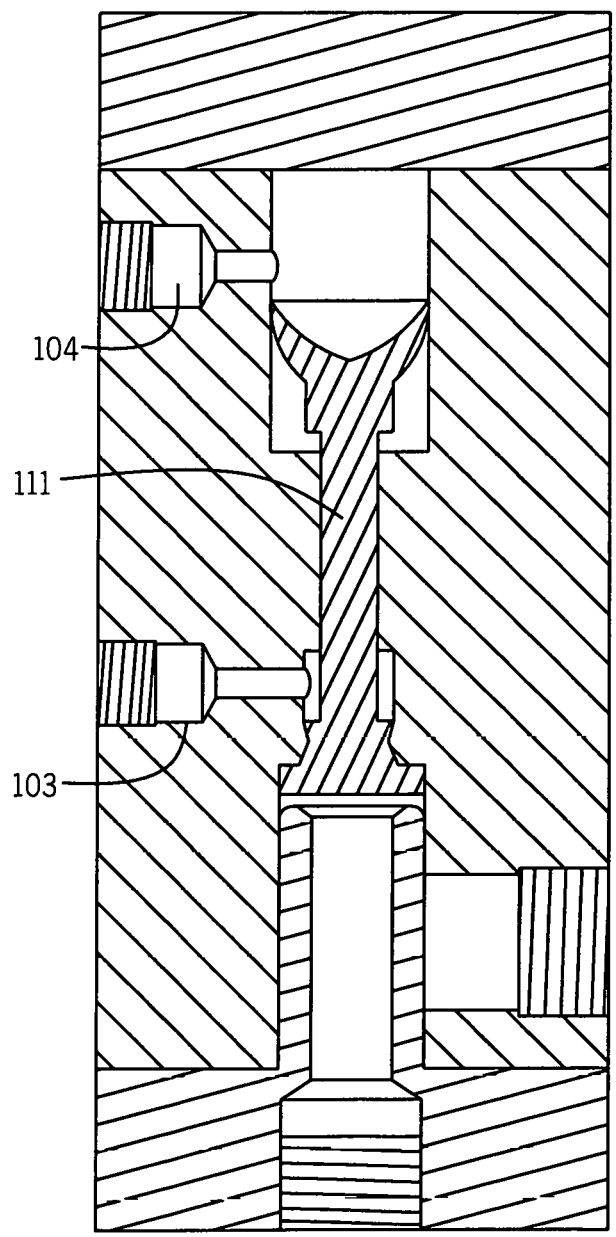
FIG. 13 an example exhaust valve.

FIG. 12 depicts the control valve 100 in the driving mode (FIG. 3). The control valve 100 receives air from the vehicle air system via the parking port 103 and the service port 104. Air from the parking port 103 increases the pressure of the parking brake chamber 6 to 125 PSI of pressure and service brake chamber 14 side to 125 PSI of pressure (i.e. the air from the parking port 103 freely flows to the parking brake chamber 6 and the service brake chamber 14 via channels 105). The parking port 103 and the service port 104 are fluidly coupled to the exhaust valves 106, 107, and the parking port 103 applies the 125 PSI of pressure to the exhaust valves 106, 107. In operation, the first exhaust valve 106 receives 125 PSI of pressure between a first diaphragm 121 and a sealing membrane 122 of the first exhaust valve 106 and the second exhaust valve 107 receives 125 PSI of pressure between a first diaphragm 131 and a sealing membrane 132 second exhaust valve 107. As such, the exhaust valves 106, 107 are in equilibrium with the chambers 6, 14 (at 125 PSI of pressure) and no air is exhausted. The shuttle valve 108 is in a first position to block air from exhausting toward the service port 104. FIG. 13 depicts an alternative example of the exhaust valve that includes a piston 111 to regulate and/or control pressure.

FIG. 14 depicts the control valve 100 in the service braking mode. As the operator depresses the brake pedal (as described above), the service port 104 receives 5 PSI of pressure from the vehicle air system and directs the air pressure toward the exhaust valves 106, 107. The first exhaust valve 106 receives 5 PSI of pressure between a second diaphragm 123 and a casing 124 of the first exhaust valve 106 which causes the first exhaust valve 106 to close. The parking brake chamber 6 is now isolated from the service brake chamber 14. Simultaneously, the second exhaust valve 107 receives 5 PSI of pressure between the first diaphragm 131 and the sealing membrane 132 of the second exhaust valve 107 which causes the second exhaust valve 107 to open such that air exhausts from the service brake chamber 14 via an exhaust port 110 defined by the second exhaust valve 107. The amount of air exhausted by the second exhaust valve 107 is controlled or limited by the 125 PSI of pressure received from the parking port 103 between the first diaphragm 131 and the sealing membrane 132 of the second exhaust valve 107 (as described above). That is, the 125 PSI of pressure between the first diaphragm 131 and the sealing membrane 132 is reduced to 120 PSI of pressure due to the 5 PSI of pressure between the second diaphragm 133 and the sealing membrane 132. As such, the second exhaust valve 107 exhausts 5 PSI of pressure from the service brake chamber 14 and the total pressure in the service brake chamber 44 is reduced to 120 PSI of pressure. The pressure differential between the air pressures in the chambers 6, 14 is 5 PSI of pressure (i.e. the parking brake chamber 6 has 125 PSI of pressure and the service brake chamber 14 has 120 PSI of pressure).

The spring brake 1 returns to the driving mode (FIG. 12) from the service braking mode (FIG. 14) as follows. As the operator releases the brake pedal (as described above), the air pressure at the service port 104 decreases. Accordingly, the 125 PSI of pressure received by exhaust valves 106, 107 from the parking port 103 operates the exhaust valves 106, 107 to add air to the service brake chamber 14 such that the air pressure in the service brake chamber 14 matches the 125 PSI of air pressure received by the parking port 103. In this example, the first exhaust valve 106 no longer receives 5 PSI of pressure from the service port 104 and thereby opens to allow the air from the parking port 103 to flow into the service brake chamber 14. Simultaneously, the second exhaust valve 107 closes (as the second exhaust valve no longer receives 5 PSI of pressure from the service port 104) to block the exhaust port 110. As such, chambers 6, 14 each are pressurized to 125 PSI of pressure and the pressure differential between the air pressures in the chambers 6, 14 is 0 PSI of pressure (i.e. the parking brake chamber 6 has 125 PSI of pressure and the service brake chamber 14 has 125 PSI of pressure).

FIG. 15 depicts the control valve 100 in an extreme service braking mode. As the operator depresses the brake pedal (as described above), the service port 104 receives 130 PSI of pressure from the vehicle air system and directs the air pressure toward the exhaust valves 106, 107 and shuttle valve 108. The first exhaust valve 106 receives 130 PSI of pressure between the second diaphragm 123 and the casing 124 which causes the first exhaust valve 106 to close and isolate the parking brake chamber 6 from the service brake chamber 14. Simultaneously, the second exhaust valve 107 receives 130 PSI of pressure between the first diaphragm 131 and the sealing membrane 132 which causes the second exhaust valve 107 to open and exhaust air from the service brake chamber 14 via the exhaust port 110 defined by the second exhaust valve 107. The amount of air exhausted by the second exhaust valve 107 is not limited by the 125 PSI of pressure received from the parking port 103 between the first diaphragm 131 and the sealing membrane 132 because the 130 PSI of pressure received from the service port 104 is greater than 125 PSI of pressure. That is, the 130 PSI of pressure between the second diaphragm 133 and the sealing membrane 132 causes the service brake chamber 125 to fully exhaust (i.e. 0 PSI of pressure in the service brake chamber 14). The shuttle valve 108 moves to a second position (FIG. 15) opposite the first position (FIG. 12) such that the service port 104 pressurizes the parking brake chamber 6 to 130 PSI of pressure. The net difference in the air pressures between the parking brake chamber 6 (130 PSI of pressure) and the service brake chamber 14 (0 PSI of pressure) is 130 PSI of pressure.

In certain examples, the spring brake 1 and/or the control valve 100 includes a controller (not shown) having a memory and a processor that is configured to control the vehicle air system and the valves of the control valve 100 to change the operational modes described above.

In certain examples, the control valve 100 includes an energy harvesting device (not shown) that converts the exhausted air (via the exhaust port 110) to energy that can be used to power sensors, communication devices, and/or the like.

In certain examples, a method for operating a vehicle spring brake includes defining a parking brake chamber with a parking brake housing and a service brake chamber with a service brake housing; positioning a flexible membrane between the parking brake housing and the service brake housing such that the flexible membrane separates the parking brake chamber from the service brake chamber. The flexible membrane flexes into and out of the service brake chamber based upon a pressure differential between an air pressure in the parking brake chamber and an air pressure in the service brake chamber. The method can further include positioning a pushrod in the service brake chamber such that the push rod extends out of the service brake housing when the flexible membrane flexes into the service brake chamber and retracts into the service brake housing when the flexible membrane flexes back out of the service brake chamber such that the pushrod applies a braking force on a vehicle when the pushrod extends out of the service brake housing and controlling, with a control valve that is coupled to a vehicle air system, the pressure differential to thereby control movement of the flexible membrane and the pushrod. The method can further include positioning a parking spring assembly in the parking brake chamber that moves between an extended state in which the parking spring assembly pushes the flexible membrane into the service brake chamber such that the pushrod extends out of the service brake housing and a retracted state in which the parking spring assembly does not push the flexible membrane into the service brake chamber.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle spring brake comprising:
    a parking brake housing that defines a parking brake chamber;
    a parking spring assembly in the parking brake chamber;
    a service brake housing that defines a service brake chamber;
    a flexible membrane between the parking brake chamber and the service brake chamber, wherein the flexible membrane is caused to flex into the parking brake chamber or the service brake chamber based on a pressure differential between air pressure in the parking brake chamber and air pressure in the service brake chamber;
    a pushrod in the service brake chamber that moves with the flexible membrane as the flexible membrane flexes; and;
    a control valve that controls the pressure differential to thereby control movement of the flexible membrane and the pushrod.

2. The vehicle spring brake according to claim 1, wherein the parking spring assembly is moveable into an extended state in which the parking spring assembly pushes the flexible membrane toward the pushrod such that the pushrod extends out of the service brake housing.

3. The vehicle spring brake according to claim 2, wherein the parking spring assembly is movable into a retracted state in which the parking spring assembly does not push the flexible membrane, and wherein the parking spring assembly is normally retained in the retracted state by the air pressure in the parking brake chamber.

4. The vehicle spring brake according to claim 3, wherein increasing the air pressure in the parking brake chamber compresses the parking spring assembly into the retracted state and wherein as the air pressure in the parking brake chamber decreases the parking spring assembly moves itself toward the extended state.

5. The vehicle spring brake according to claim 4, further comprising an air-tight flexible envelope that envelops the parking spring assembly; and
    wherein increasing the air pressure in the parking brake chamber compresses the air-tight flexible envelope and thereby compresses the parking spring assembly into the retracted state.

6. The vehicle spring brake according to claim 4, wherein the parking spring assembly comprises a parking spring, and wherein as the air pressure in the parking brake chamber decreases the parking spring naturally extends the parking spring assembly into the extended state.

7. The vehicle spring brake according to claim 6, wherein the parking spring assembly further comprises end plates on opposing sides of the parking spring;
    wherein the parking spring has a natural resiliency that tends to bias the end plates apart from each other; and
    wherein increasing the air pressure in the parking brake chamber compresses the air-tight flexible envelope and thereby forces the end plates toward each other against the natural resiliency of the parking spring.

8. The vehicle spring brake according to claim 7, wherein the end plates have telescoping sleeves that telescope with respect to each other as the air pressures in the parking brake chamber and the spring brake chamber change.

9. The vehicle spring brake according to claim 7, further comprising a guide rod coupled to the parking brake housing and extending into the parking brake chamber, wherein the guide rod guides the end plates along an axis as the parking spring compresses and extends.

10. The vehicle spring brake according to claim 1, further comprising a return spring on the pushrod, and wherein the return spring has a natural resiliency that tends to retract the pushrod into the service brake chamber.

11. The vehicle spring brake according to claim 10, further comprising an end plate on the pushrod, and wherein the return spring is disposed between the end plate and an inner end surface of the service brake housing.

12. The vehicle spring brake according to claim 11, wherein the end plate is fixed to the flexible membrane such that the flexible membrane and the end plate move together.

13. The vehicle spring brake according to claim 1, wherein the pushrod is configured for attachment to a braking apparatus for a vehicle, wherein extension of the pushrod out of the service brake housing causes the braking apparatus to apply a braking force on the vehicle and wherein retraction of the pushrod into the service brake housing causes the braking apparatus to decrease the braking force on the vehicle.

14. The vehicle spring brake according to claim 13, wherein the braking apparatus comprises a brake adjustor and a brake drum.

15. The vehicle spring brake according to claim 1, wherein the control valve decreases the air pressure in the service brake chamber such that the pressure differential changes, the flexible membrane flexes toward the pushrod, and the pushrod extends out of the service brake housing.

16. The vehicle spring brake according to claim 15, wherein the control valve decreases the air pressure in the service brake chamber by exhausting air from the service brake chamber.

17. A vehicle spring brake comprising:
    a parking brake housing that defines a parking brake chamber;
    a service brake housing that defines a service brake chamber;
    a flexible membrane between the parking brake chamber and the service brake chamber, wherein the flexible membrane is caused to flex into the parking brake chamber or the service brake chamber based on a pressure differential between air pressure in the parking brake chamber and air pressure in the service brake chamber;
    a pushrod in the service brake chamber that moves with the flexible membrane as the flexible membrane flexes;
    a control valve that controls the pressure differential to thereby control movement of the flexible membrane and the pushrod;

a parking spring assembly in the parking brake chamber, wherein the parking spring assembly is movable into and between:
  an extended state in which the parking spring assembly pushes the flexible membrane such that the pushrod extends out of the service brake housing; and
  a retracted state in which the parking spring assembly does not push the flexible membrane or push the pushrod out of the service brake housing; and
a return spring on the pushrod that has a natural resiliency that tends to cause the pushrod to retract into the service brake chamber.

18. A vehicle spring brake comprising:
a parking brake housing that defines a parking brake chamber;
a parking spring assembly in the parking brake chamber;
a service brake housing that defines a service brake chamber;
a flexible membrane between the parking brake chamber and the service brake chamber, wherein the flexible membrane is caused to flex into the parking brake chamber or the service brake chamber based on a pressure differential between air pressure in the parking brake chamber and air pressure in the service brake chamber; and
a pushrod in the service brake chamber that moves with the flexible membrane as the flexible membrane flexes.

19. The vehicle spring brake according to claim 18, wherein the flexible membrane flexes in a first direction when the air pressure in the service brake chamber is less than the air pressure in the parking brake chamber, and wherein the flexible membrane moves in an opposite second direction when the air pressure in the service brake chamber is equal to or greater than the air pressure in the parking brake chamber.

20. The vehicle spring brake according to claim 18, further comprising a control valve that controls the air pressure in the parking brake chamber and the air pressure in the service brake chamber to thereby vary the pressure differential.

21. A method for operating a vehicle spring brake, the method comprising:
defining a parking brake chamber with a parking brake housing and a service brake chamber with a service brake housing;
positioning a flexible membrane between the parking brake chamber and the service brake chamber, wherein the flexible membrane is caused to flex into the parking brake chamber or the service brake chamber based on a pressure differential between air pressure in the parking brake chamber and air pressure in the service brake chamber;
positioning a pushrod in the service brake chamber such that the pushrod moves with the flexible membrane as the flexible membrane flexes, wherein the pushrod extends from the service brake housing when the flexible membrane flexes into the service brake chamber such that the pushrod applies a braking force on a vehicle; and
controlling, with a control valve that is coupled to a vehicle air system, the pressure differential to thereby control movement of the flexible membrane and the pushrod.

22. The method according to claim 21, further comprising positioning a parking spring assembly in the parking brake chamber that moves between an extended state in which the parking spring assembly pushes the flexible membrane into the service brake chamber such that the pushrod extends out of the service brake housing and a retracted state in which the parking spring assembly does not push the flexible membrane into the service brake chamber.

* * * * *